US010028519B2

(12) United States Patent
Banavara

(10) Patent No.: US 10,028,519 B2
(45) Date of Patent: Jul. 24, 2018

(54) NUTRITIONAL COMPOSITIONS CONTAINING CERAMIDE AND USES THEREOF

(71) Applicant: Mead Johnson Nutrition Company, Glenview, IL (US)

(72) Inventor: Dattatreya Banavara, Newburgh, IN (US)

(73) Assignee: Mead Johnson Nutrition Company, Chicago, IL (US)

( * ) Notice: Subject to any disclaimer, the term of this patent is extended or adjusted under 35 U.S.C. 154(b) by 434 days.

(21) Appl. No.: 14/197,998

(22) Filed: Mar. 5, 2014

(65) Prior Publication Data

US 2015/0250220 A1    Sep. 10, 2015

(51) Int. Cl.
*A23L 33/105*    (2016.01)
*A23L 33/00*    (2016.01)

(52) U.S. Cl.
CPC ............. *A23L 33/105* (2016.08); *A23L 33/40* (2016.08)

(58) Field of Classification Search
CPC .............................. A23L 1/296; A23L 1/3002
See application file for complete search history.

(56) References Cited

U.S. PATENT DOCUMENTS

| | | | |
|---|---|---|---|
| 4,791,193 A | 12/1988 | Okonogi et al. | |
| 5,849,885 A | 12/1998 | Nuyens | |
| 5,861,491 A | 1/1999 | Nuijens | |
| 5,919,913 A | 7/1999 | Nuyens | |
| 6,620,326 B1 | 9/2003 | Lihme et al. | |
| 6,977,046 B2 | 12/2005 | Hubbuch et al. | |
| 7,368,141 B2 | 5/2008 | Lihme | |
| 7,812,138 B2 | 10/2010 | Lihme et al. | |
| 7,951,410 B2 | 5/2011 | McMahon et al. | |
| 2008/0003329 A1* | 1/2008 | Rueda ................... | A23L 1/296 426/72 |
| 2011/0293784 A1* | 12/2011 | Wittke ................... | A61K 47/42 426/61 |

FOREIGN PATENT DOCUMENTS

| | | |
|---|---|---|
| JP | 2004254632 | 9/2004 |
| JP | 2006022005 | 1/2006 |
| WO | 199200799 | 1/1992 |
| WO | 199717132 | 5/1997 |
| WO | 200218237 | 3/2002 |
| WO | 2005070404 | 8/2005 |
| WO | 2009082214 | 7/2009 |
| WO | 2014109862 | 7/2014 |

OTHER PUBLICATIONS

Emmett et al.,"Properties of human milk and their relationship with maternal nutrition," Early Human Development, 49 Suppl (1997), p. S7-S28.*
Bode et al.,"Human and Bovine Milk Gangliosides differ in Their Fatty Acid Composition"—American Society for Nutritional Sciences, , Aug. 2004, p. 3016-3020.*
Brenna et al., "Docosahexaenoic and arachidonic acid concentrations in human breast milk worldwide" in Am J. Clin Nutr, 85 (2007), p. 1457-1464.*
Brock, J.H., "Lactoferrin in human milk: its role in iron absorption and protection against enteric infection in the newborn infant"—Archives of Disease in Childhood, 1980, 55, p. 417-421.*
Hale et al., "The Absence of Candida albicans in Milk Samples of Women with Clinical Symptoms of Ductal Candidiasis"—Breastfeeding Medicine, vol. 4, No. 2, 2009, p. 57-61.*
Losnedahl et al., "Antimicrobial Factors in Milk"—Jan. 1996, https://www.researchgate.net/publication/260171252_Antimicrobial_Factors_in_Milk, downloaded Jul. 26, 2016.*
Bouhours et al., "Ceramide Structure of Sphingomyelin from Human Milk Fat Globule Membrane"—Lipids, vol. 16, No. 10, 1981, pp. 726-731.*
Vesper et al., "Spingolipids in Food and the Emerging Importance of Sphingolipids to Nutrition", The Journal of Nutrition, vol. 129, No. 7, 1999, pp. 1239-1250.*
Newburg et al., "Neutral Glycolipids of Human and Bovine Milk"—Lipids, vol. 27, No. 11, 1992, pp. 923-927.*
Wang et al., "The role and potential of sialic acid in human nutrition"—European Journal of Clinical Nutrition, 57, 2003, pp. 1351-1369.*
Miller et al., "The Oligosaccharide Composition of Human Milk: Temporal and Individual Variations in Monosaccharide Components"—Journal of Pediatric Gastroenterology and Nutrition, 19, 1994, pp. 371-376.*
Chuang et al., "Free Amino Acids in Full-Term and Pre-Term Human Milk"—Journal of Pediatric Gastroenterology and Nutrition, 40(4), 2005, pp. 496-500.*
Hazama et al., "Antitumor agents, tumor cell proliferation inhibitors, immunostimulants, and foods containing beta-glucosylceraminde," Dec. 7, 2006, XP002738027 retrieved from STN Databbse accession No. 2006:1278674 abstract.
Yunoki, K., et al., "Dietary Sphingolipids Ameliorate Disorders of Lipid Metabolism in Zucker Fatty Rats," J. Agric. Food Chem. 2010, 58, 7030-7035.
Ceramides: structure, occurrence, biosynthesis and analysis. @lipidlibrary.aocs.org Aug. 2, 2012.
Gangliosides: structure, occurrence, biosynthesis and analysis. ©lipidlibrary.aocs.org Jan. 30, 2014.

(Continued)

*Primary Examiner* — Elizabeth Gwartney
(74) *Attorney, Agent, or Firm* — OspreyIP, pllc; James R. Cartiglia

(57) ABSTRACT

The present disclosure relates to nutritional compositions that include at least one ceramide. The nutritional compositions may further include galactose, sialic acid, or cholesterol. Ceramide and galactose may be provided by a plant-based source. The nutritional composition including ceramide and galactose from a plant base source may reduce the risk of cross-contaminating the nutritional composition with animal-based protein allergens. These plant-based ceramides and galactose may exhibit additive or synergistic beneficial health effects when consumed. The disclosure further relates to methods of reducing the incidence of skin rash caused by an allergy or promoting brain and eye health in a target subject by providing a nutritional composition comprising ceramides, galactose, sialic acid, and cholesterol to targeted subjects.

15 Claims, No Drawings

(56) References Cited

OTHER PUBLICATIONS

Kimata, H., "Improvement of Atopic Dermatitis and Reduction of Skin Allergic Responses by Oral Intake of Konjac Ceramide," Pediatric Dermatology vol. 23 No. 4 386-389, 2006.

McJarrow, P., et al., "Influence of dietary gangliosides on neonatal brain development," Nutrition Reviews vol. 67 (8):451-463.

Rahmann, H., "Brain gangliosides and memory formation," Behavioural Brain Research 66 (1995) 105-116.

Rosner, H., "Development Expression and Possible Roles of Gangliosides in Brain Development," Progress in Molecular and Subcellular Biology, vol. 32 p. 49-73, 2003.

Tsuji, K., et al., "Dietary glucosyleramide improves skin barrier function in hairless mice," Journal of Dermatological Science (2006) 44, 101-107.

Vielhaber, G., et al., "Localization o Ceramide and Glucosylceramide in Human Epidermis by Immunogold Electron Microscopy," J. Invest Dermatol 117:1126-1136,2001.

Yadomae, T., "Structure and biological activities of fungal beta-1,3-glucans." Yakugaku Zasshi. 2000;120:413-431.

Christie "Monoglycosylceramides (Cerebrosides)" in the AOCS Lipid Library (www.lipidlibrary.aocs.org/Primer/content.cfm?ItemNumber=39305), last updated 2014.

* cited by examiner

NUTRITIONAL COMPOSITIONS CONTAINING CERAMIDE AND USES THEREOF

TECHNICAL FIELD

The present disclosure relates generally to nutritional compositions comprising ceramides. In some embodiments, the nutritional compositions include ceramides derived from a plant-based source. Providing a nutritional composition comprising ceramides will promote skin and eye health and may further promote brain development. The nutritional compositions are suitable for administration to pediatric subjects.

Additionally, the disclosure relates to methods for promoting skin and/or eye health and healthy brain development by providing a nutritional composition to a target subject that includes ceramides. Further, the disclosure relates to methods of reducing the incidence of skin rash associated with a food allergy in a target subject by providing a nutritional composition that includes ceramides. The nutritional composition including ceramides may provide additive and or/synergistic beneficial health effects.

BACKGROUND ART

Food allergies are usually manifested by moderate to severe skin rashes, e.g. atopic dermatitis. Patients with food allergies manifested by skin rashes may have severe skin impairment and thus exhibit a constant need for attention. The stratum corneum of the skin, where skin rashes may occur, consists of relatively high levels of ceramides, for example up to as much as 50% of the total lipids in this layer may be comprised of ceramides. These ceramides are present mainly in the extracellular domains (interstices) and are accompanied by nearly equimolar amounts of cholesterol and free fatty acids. The ratio between the ceramides, cholesterol and free fatty acids is believed to be essential for the normal organization of the tissue into the membrane structures that are responsible for proper functioning of the epidermal barrier.

Ceramides are molecules with sphingoid bases connected to a fatty acid via an amide link. Ceramides are structurally heterogeneous and complex group of sphingolipids containing derivatives of sphigosine bases in amide linkage with a variety of fatty acids. Differences in chain length, type and extent of hydroxylation, saturation, etc. are responsible for the heterogeneity of the epidermal sphigolipids. Ceramides may play an essential role in structuring and maintaining the water permeability barrier function of the skin. In conjunction with other corneum lipids, ceramides form ordered structures.

Further, ceramides may be linked to any hexose sugar thus forming hexosyl ceramides. For example, glucosyl-ceramides are present in plant foods and are considered to be very important for skin health. Glucosyl-ceramides are the precursors of gangliosides, which are known to be important for brain development. Dietary gangliosides are known to increase the ganglioside accumulation in brain and other parts of the nervous system as early as age two to four. Gangliosides are available as dietary components only in animal products especially in milk-based products. Gangliosides are part of the milk fat globule membrane, which gets distributed into several milk ingredients during processing.

One of the main solutions for individuals suffering from food allergies is to identify the allergen and avoid it. For example, infants and children with milk and other multiple food protein allergies may be fed hypoallergenic formulas that contain protein hydrolysates sourced from casein, whey, rice, pea, soy, etc. However, given that many nutrients included in pediatric nutritional compositions, including infant formulas, include ingredients sourced from animal sources, these additional ingredients may inadvertently introduce allergens to the nutritional composition.

For example, gangliosides cannot be added to many hypoallergenic products, unless highly purified, due to the risk of cross-contamination with milk proteins. It is believed that the human body is capable of producing gangliosides provided the precursors are available to the body in dietary form. However, synthesis of several types of gangliosides as required by the body may be limited by the presence of galactose and sialic acid in the system.

Accordingly, it would be beneficial to provide nutritional composition that includes ceramides that may alleviate skin issues, including skin rashes. Further, it is beneficial to provide a nutritional composition including ceramides derived from a plant-based source so as not to introduce allergens in the nutritional composition. Moreover, providing a nutritional composition that includes cermides may promote brain and eye health and/or development in individuals suffering from certain food allergies, especially children and infants.

Moreover, disclosed herein are methods for reducing the severity of a food allergy manifesting as a skin condition or promoting brain development in a subject by administering a hypoallergenic nutritional composition including ceramides derived from a plant-based source.

BRIEF SUMMARY

Briefly, the present disclosure is directed, in an embodiment, to a nutritional composition that contains a carbohydrate source, a protein source, a lipid source, and ceramides. In some embodiments, the nutritional composition further comprises at least one of the following nutrients: ceramides, galactose, sialic acid, cholesterol, and combinations thereof. In some embodiments, the ceramides, galactose, and/or sialic acid may be derived from a plant-based source.

In some embodiments, the nutritional compositions disclosed herein may be infant formula. In certain embodiments the nutritional composition(s) may optionally contain least one probiotic, at least one prebiotic, a source of long chain polyunsaturated fatty acids ("LCPUFAs"), for example docosahexaenoic acid ("DHA") and/or arachidonic acid ("ARA"), β-glucan, lactoferrin, a source of iron, and mixtures of one or more thereof.

Additionally, the disclosure is directed to a method of reducing the incidence of skin rash in a subject by providing a nutritional composition having a carbohydrate source, a lipid source, a protein source, and ceramides. In some embodiments, the skin rash may be caused by a food allergy. In embodiments where the skin rash is caused by a food allergy, the nutritional composition may be hypoallergenic and include ceramides derived from a plant-based source. In some embodiments, the nutritional composition may further include at least one nutrient selected from: galactose, sialic acid, cholesterol, and combinations thereof.

Further provided herein are methods for promoting brain development and/or promoting eye health by providing a nutritional composition having a carbohydrate source, a lipid source, a protein source, and ceramides.

It is to be understood that both the foregoing general description and the following detailed description present embodiments of the disclosure and are intended to provide an overview or framework for understanding the nature and character of the disclosure as it is claimed. The description serves to explain the principles and operations of the claimed subject matter. Other and further features and advantages of the present disclosure will be readily apparent to those skilled in the art upon a reading of the following disclosure.

DETAILED DESCRIPTION

Reference now will be made in detail to the embodiments of the present disclosure, one or more examples of which are set forth herein below. Each example is provided by way of explanation of the nutritional composition of the present disclosure and is not a limitation. In fact, it will be apparent to those skilled in the art that various modifications and variations can be made to the teachings of the present disclosure without departing from the scope of the disclosure. For instance, features illustrated or described as part of one embodiment, can be used with another embodiment to yield a still further embodiment.

Thus, it is intended that the present disclosure covers such modifications and variations as come within the scope of the appended claims and their equivalents. Other objects, features and aspects of the present disclosure are disclosed in or are apparent from the following detailed description. It is to be understood by one of ordinary skill in the art that the present discussion is a description of exemplary embodiments only and is not intended as limiting the broader aspects of the present disclosure.

The present disclosure relates generally to nutritional compositions comprising a carbohydrate source, a lipid source, a protein source and ceramides. In some embodiments the nutritional compositions further include at least one nutrient selected from: galactose, sialic acid, cholesterol, and/or combinations thereof. Additionally, the disclosure relates to methods of reducing the incidence of food allergy, reducing the incidence skin rash association with a food allergy, promoting brain development, and/or promoting eye health in a human subject by providing a nutritional composition comprising a carbohydrate source, a lipid source, a protein source, and ceramides. In some embodiments, the ceramides are derived from a plant-based source.

"Nutritional composition" means a substance or formulation that satisfies at least a portion of a subject's nutrient requirements. The terms "nutritional(s)", "nutritional formula(s)", "enteral nutritional(s)", and "nutritional supplement(s)" are used as non-limiting examples of nutritional composition(s) throughout the present disclosure. Moreover, "nutritional composition(s)" may refer to liquids, powders, gels, pastes, solids, concentrates, suspensions, or ready-to-use forms of enteral formulas, oral formulas, formulas for infants, formulas for pediatric subjects, formulas for children, growing-up milks and/or formulas for adults.

The term "enteral" means deliverable through or within the gastrointestinal, or digestive, tract. "Enteral administration" includes oral feeding, intragastric feeding, transpyloric administration, or any other administration into the digestive tract. "Administration" is broader than "enteral administration" and includes parenteral administration or any other route of administration by which a substance is taken into a subject's body.

"Pediatric subject" means a human less than 13 years of age. In some embodiments, a pediatric subject refers to a human subject that is between birth and 8 years old. In other embodiments, a pediatric subject refers to a human subject between 1 and 6 years of age. In still further embodiments, a pediatric subject refers to a human subject between 6 and 12 years of age. The term "pediatric subject" may refer to infants (preterm or full term) and/or children, as described below.

"Infant" means a human subject ranging in age from birth to not more than one year and includes infants from 0 to 12 months corrected age. The phrase "corrected age" means an infant's chronological age minus the amount of time that the infant was born premature. Therefore, the corrected age is the age of the infant if it had been carried to full term. The term infant includes low birth weight infants, very low birth weight infants, extremely low birth weight infants and preterm infants. "Preterm" means an infant born before the end of the 37th week of gestation. "Late preterm" means an infant form between the $34^{th}$ week and the $36^{th}$ week of gestation. "Full term" means an infant born after the end of the $37^{th}$ week of gestation. "Low birth weight infant" means an infant born weighing less than 2500 grams (approximately 5 lbs, 8 ounces). "Very low birth weight infant" means an infant born weighing less than 1500 grams (approximately 3 lbs, 4 ounces).

"Extremely low birth weight infant" means an infant born weighing less than 1000 grams (approximately 2 lbs, 3 ounces).

"Child" means a subject ranging in age from 12 months to about 13 years. In some embodiments, a child is a subject between the ages of 1 and 12 years old. In other embodiments, the terms "children" or "child" refer to subjects that are between one and about six years old, or between about seven and about 12 years old. In other embodiments, the terms "children" or "child" refer to any range of ages between 12 months and about 13 years.

"Infant formula" means a composition that satisfies at least a portion of the nutrient requirements of an infant. In the United States, the content of an infant formula is dictated by the federal regulations set forth at 21 C.F.R. Sections 100, 106, and 107. These regulations define macronutrient, vitamin, mineral, and other ingredient levels in an effort to simulate the nutritional and other properties of human breast milk.

The term "growing-up milk" refers to a broad category of nutritional compositions intended to be used as a part of a diverse diet in order to support the normal growth and development of a child between the ages of about 1 and about 6 years of age.

"Nutritionally complete" means a composition that may be used as the sole source of nutrition, which would supply essentially all of the required daily amounts of vitamins, minerals, and/or trace elements in combination with proteins, carbohydrates, and lipids. Indeed, "nutritionally complete" describes a nutritional composition that provides adequate amounts of carbohydrates, lipids, essential fatty acids, proteins, essential amino acids, conditionally essential amino acids, vitamins, minerals and energy required to support normal growth and development of a subject.

A nutritional composition that is "nutritionally complete" for a full term infant will, by definition, provide qualitatively and quantitatively adequate amounts of all carbohydrates, lipids, essential fatty acids, proteins, essential amino acids, conditionally essential amino acids, vitamins, minerals, and energy required for growth of the full term infant.

A nutritional composition that is "nutritionally complete" for a child will, by definition, provide qualitatively and quantitatively adequate amounts of all carbohydrates, lipids, essential fatty acids, proteins, essential amino acids, conditionally essential amino acids, vitamins, minerals, and energy required for growth of a child.

The nutritional composition of the present disclosure may be substantially free of any optional or selected ingredients described herein, provided that the remaining nutritional composition still contains all of the required ingredients or features described herein. In this context, and unless otherwise specified, the term "substantially free" means that the selected composition may contain less than a functional amount of the optional ingredient, typically less than 0.1% by weight, and also, including zero percent by weight of such optional or selected ingredient.

As applied to nutrients, the term "essential" refers to any nutrient that cannot be synthesized by the body in amounts sufficient for normal growth and to maintain health and that, therefore, must be supplied by the diet. The term "conditionally essential" as applied to nutrients means that the nutrient must be supplied by the diet under conditions when adequate amounts of the precursor compound is unavailable to the body for endogenous synthesis to occur.

The term "degree of hydrolysis" refers to the extent to which peptide bonds are broken by a hydrolysis method. For example, the protein equivalent source of the present disclosure may, in some embodiments comprise hydrolyzed protein having a degree of hydrolysis of no greater than 40%. For this example, this means that at least 40% of the total peptide bonds have been cleaved by a hydrolysis method.

The term "partially hydrolyzed" means having a degree of hydrolysis, which is greater than 0% but less than 50%.

The term "extensively hydrolyzed" means having a degree of hydrolysis, which is greater than or equal to 50%.

"Probiotic" means a microorganism with low or no pathogenicity that exerts at least one beneficial effect on the health of the host.

In an embodiment, the probiotic(s) may be viable or non-viable. As used herein, the term "viable", refers to live microorganisms. The term "non-viable" or "non-viable probiotic" means non-living probiotic microorganisms, their cellular components and/or metabolites thereof. Such non-viable probiotics may have been heat-killed or otherwise inactivated, but they retain the ability to favorably influence the health of the host. The probiotics useful in the present disclosure may be naturally-occurring, synthetic or developed through the genetic manipulation of organisms, whether such source is now known or later developed.

The term "inactivated probiotic" means a probiotic wherein the metabolic activity or reproductive ability of the referenced probiotic organism has been reduced or destroyed. The "inactivated probiotic" does, however, still retain, at the cellular level, at least a portion its biological glycol-protein and DNA/RNA structure. As used herein, the term "inactivated" is synonymous with "non-viable". More specifically, a non-limiting example of an inactivated probiotic is inactivated *Lactobacillus rhamnosus* GG ("LGG") or "inactivated LGG".

The term "cell equivalent" refers to the level of non-viable, non-replicating probiotics equivalent to an equal number of viable cells. The term "non-replicating" is to be understood as the amount of non-replicating microorganisms obtained from the same amount of replicating bacteria (cfu/g), including inactivated probiotics, fragments of DNA, cell wall or cytoplasmic compounds. In other words, the quantity of non-living, non-replicating organisms is expressed in terms of cfu as if all the microorganisms were alive, regardless whether they are dead, non-replicating, inactivated, fragmented etc.

"Prebiotic" means a non-digestible food ingredient that beneficially affects the host by selectively stimulating the growth and/or activity of one or a limited number of bacteria in the digestive tract that can improve the health of the host.

"β-glucan" means all β-glucan, including specific types of β-glucan, such as β-1,3-glucan or β-1,3;1,6-glucan. Moreover, β-1,3;1,6-glucan is a type of β-1,3-glucan. Therefore, the term "β-1,3-glucan" includes β-1,3;1,6-glucan.

As used herein, "non-human lactoferrin" means lactoferrin which is produced by or obtained from a source other than human breast milk. In some embodiments, non-human lactoferrin is lactoferrin that has an amino acid sequence that is different than the amino acid sequence of human lactoferrin. In other embodiments, non-human lactoferrin for use in the present disclosure includes human lactoferrin produced by a genetically modified organism. The term "organism", as used herein, refers to any contiguous living system, such as animal, plant, fungus or micro-organism.

"Inherent lutein" or "lutein from endogenous sources" refers to any lutein present in the formulas that is not added as such, but is present in other components or ingredients of the formulas; the lutein is naturally present in such other components.

The terms "protein-free" mean containing no measurable amount of protein, as measured by standard protein detection methods such as sodium dodecyl (lauryl) sulfate-polyacrylamide gel electrophoresis (SDS-PAGE) or size exclusion chromatography.

All percentages, parts and ratios as used herein are by weight of the total composition, unless otherwise specified.

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

The methods and compositions of the present disclosure, including components thereof, can comprise, consist of, or consist essentially of the essential elements and limitations of the embodiments described herein, as well as any additional or optional ingredients, components or limitations described herein or otherwise useful in nutritional compositions.

As used herein, the term "about" should be construed to refer to both of the numbers specified as the endpoint(s) of any range. Any reference to a range should be considered as providing support for any subset within that range.

The present disclosure is directed to nutritional compositions containing a carbohydrate source, a protein source, a lipid source, and ceramides. In some embodiments, the disclosure is directed to a nutritional composition containing a carbohydrate source, a protein source, a lipid source, and at least one nutrient selected from the following: ceramides, galactose, sialic acid, cholesterol, and/or combinations thereof.

Without being bound by any particular theory, it is believed that including ceramides, galactose, and sialic acid, sourced from a plant-based source, may provide health benefits, such as promoting brain development and eye health, while minimizing the risk of contaminating the nutritional composition with allergenic animal proteins. As such, in some embodiments, the nutritional composition is a hypoallergenic nutritional composition that includes ceramides, galactose, sialic acid and combinations thereof derived from a plant-based source. In some embodiments, sialic acid and cholesterol can be provides in synthetic and free forms. Still in other embodiments, cholesterol can be provided from lanolin, which is sheep wool wax, with no fear of contamination.

In some embodiments, the nutritional compositions disclosed herein, may include ceramides in an amount of from about 15 µg/100 kcal to about 3 mg/100kcal. In some embodiments, the nutritional composition may include ceramides in an amount of from about 120 µg/100 kcal to about 1.5 mg/100 kcal. In some embodiments, the nutritional composition may include ceramides from about 300 µg/100 kcal to about 750µg/100 kcal.

Ceramides suitable for inclusion in the nutritional composition(s) disclosed herein include any ceramide attached to a sugar moeity, but are not limited to: galactosyl-ceramide, glucosyl-ceramide, lactosyl-ceramide and combinations thereof.

In some embodiments, the source of the ceramides may be any suitable plant or grain source for example, wheat, barley, oat, corn, soy, wheat germ oil, unrefined corn oil, soy lecithin enriched using polar solvents by supercritical methods, barley malt harvested particular time temperature condition can have enriched glucosyl-ceramide and other ceramides. In some embodiments, the ceramide plant source may be enriched with ceramides through any suitable mechanism. Several types of ceramides may also come from fungal sources including the fungi, *Saccharomyces cerevisae*. Moreover, in some embodiments the ceramide source utilized may further include any saturated or unsaturated fatty acid specific to the source.

In some embodiments, the nutritional composition may include galactose. In some embodiments, the nutritional composition includes galactose in an amount of from about 15 mg/100 kcal to about 450 mg/100 kcal. Still in some embodiments, the nutritional composition includes galactose in an amount of from about 45 mg/100 kcal to about 300 mg/100 kcal. In other embodiments, the nutritional composition includes galactose in an amount of from about 75 mg/100 kcal to about 225 mg/100 kcal. In certain embodiments, the nutritional composition includes galactose in an amount of from about 110 mg/100 kcal to about 150 mg/100 kcal.

In some embodiments, galactose may be added to the nutritional composition as part of galacto-oligosaccharides ("GOS"), galactomannans, or combinations thereof. In some embodiments, the source of the galactose may be lactose, and/or hydrocolloids, such as carrageenan and/or pectins. In some embodiments, the galactose source may be any suitable plant source like locust bean, guar, fenugreek or microbial sources.

In some embodiments the nutritional composition comprises sialic acid. Sialic acids are a family of over 50 members of 9-carbon sugars, all of which are derivatives of neuroaminic acid. Sialic acids are found in milk, such as bovine and caprine. In mammals, neuronal cell membranes have the highest concentration of sialic acid compared to other body cell membranes.

The most common member of the sialic acid family is N-acetyl-neuraminic acid or 2-keto-acetamindo-3,5-dideoxy-D-glycero-D-galctononulopyranos-1-onic acid, often abbreviated Neu5Ac, NeuAc, or NANA. A second member of the family is N-glycolyl-neuraminic acid, abbreviated Neu5Ge or NeuGe, in which the N-acetyl group of NeuAc is hydroxylated. A third sialic acid family member is 2-keto-3-deoxy-nonulosonic acid, ("KDN"). Also included are O-substituted sialic acids such as 9-O-C1C6 acyl-Neu5Ac like 9-O-lactyl-Neu5Ac or 9-O-acetyl-Neu5Ac, 9-deoxy-9-fluoro-Neu5Ac and 9-azido-9-deoxy-Neu5Ac.

Non-limiting suitable sources for the sialic acids of the present disclosure include free sialic acid, such as NANA, as well as sialic acid complexed to oligosaccharides, glycoproteins, and gangliosides. Since oligosaccharides are polymers of varying numbers of residues, linkages, and subunits; the number of different possible stereoisomeric oligosaccharide chains is enormous. Therefore, if sialic acid is in complex with an oligosaccharide, the nutritional compositions of the present disclosure may utilize sialic with any form of sugar moiety, either naturally found or artificially formulated from simple to complex.

Sialic acid residues are also known to be components of gangliosides. Gangliosides are a class of glycolipids, which generally consist of three elements. These elements include one or more sialic acid residues that are attached to an oligosaccharide or carbohydrate core moiety, which is attached to a hydrophobic lipid structure, such as a ceramide, which generally is embedded in the cell membrane. The ceramide portion includes a long chain base portion and a fatty acids portion.

Additionally, U.S. patent application Ser. No. 10/964,290, now U.S. Pat. No. 7,951,410 discloses a caseinoglycomacropeptide ("cGMP") having an enhanced concentration of sialic acid and a cGMP having an enhanced concentration of sialic acid and a reduced level of threonine. The disclosure of U.S. Pat. No. 7,951,410 is incorporated in its entirety herein. Accordingly, in some embodiments, the nutritional compositions of the present disclosure may include cGMP having an enhanced concentration of sialic acid.

When present, sialic acid may be included in the nutritional composition in an amount of from about 1.5 mg/100 kcal to about 75 mg/100 kcal. In some embodiments, sialic acid may be included in an amount of from about 3.5 mg/100 kcal to about 35 mg/100 kcal. In some embodiments, sialic acid may be included in an amount of from about 8.5 mg/100 kcal to about 30 mg/100 kcal. Still in some embodiments, sialic acid may be present in an amount of from about 15 mg/100 kcal to about 26 mg/100 kcal.

Cholesterol may also be present in the nutritional composition(s) of the present disclosure. In some embodiments, cholesterol is present from about 50 mg/100 kcal to about 400 mg/100 kcal. In other embodiments, cholesterol is present in the nutritional composition from about 75 mg/100 kcal to about 300 mg/100 kcal. In other embodiments cholesterol is present from about 100 mg/100 kcal to about 250 mg/100 kcal. In still other embodiments, cholesterol is present in the nutritional composition from about 100 mg/100 kcal to about 200 mg/100 kcal.

In one embodiment, cholesterol sources for the present disclosure include, but are not limited to, milk, other dairy products, eggs, meat, beef tallow, poultry, fish, shellfish and any other resources, fortified or not, from which cholesterol could be obtained and used in a nutritional composition. Sources of cholesterol also include precursors such as squalene, lanosterol, dimethylsterol, methostenol, lathosterol, and desmosterol. Furthermore, cholesterol for use in the present disclosure may be sourced from animal sources, such as sheep wool. The cholesterol could be part of a complex mixture obtained by separation technology known in the art aimed at enrichment of the cholesterol and the derivatives or precursors of cholesterol in such mixtures.

Without being bound by any particular theory, addition of ceramides, galactose, sialic acid, cholesterol, and combinations thereof may provide additive and/or synergistic effects and is likely to better support skin health, cognitive health, brain health, and eye health.

In some embodiments, the ceramides, galactose, sialic acid, and/or cholesterol may be incorporated into the nutritional composition(s) described herein by any method well-known in the art. In some embodiments, these nutrients may be substituted for other ingredients that do not include ceramides, galactose, sialic acid, and/or cholesterol. In some embodiments, ceramides, galactose, sialic acid and/or cholesterol may be added to the nutritional composition.

In one embodiment, where the nutritional composition is an infant formula, the ceramides, galactose, sialic acid, and/or cholesterol may be added to a commercially available infant formula. For example, Enfalac, Enfamil®, Enfamil® Premature Formula, Enfamil® with Iron, Enfamil® LIPIL®, Lactofree®, Nutramigen®, Pregestimil®, and ProSobee® (available from Mead Johnson & Company, Evansville, Ind., U.S.A.) may be supplemented with ceramides, galactose, sialic acid, and/or cholesterol, and used in practice of the current disclosure.

In some embodiments, the ceramides, galactose, sialic acid, and/or cholesterol may be included in prenatal dietary supplements. These nutrients may be incorporated into prenatal dietary supplements by any method known in the art. The prenatal administration of ceramides, galactose, sialic acid, and/or cholesterol as disclosed herein may directly impact the development of the fetus and embryo. Since brain development begins early in prenatal life, the inclusion of ceramides, galactose, sialic acid, and/or cholesterol in a prenatal dietary supplement may promote brain development and neurogenesis in pediatric subjects while still in utero.

Conveniently, commercially available prenatal dietary supplements and/or prenatal nutritional products may be used. For example, Expecta® Supplement (available from Mead Johnson Nutrition Company, Glenview, Ill., U.S.A.) may be supplemented with suitable levels of the ceramides, galactose, sialic acid, and cholesterol and used in practice of the present disclosure.

The prenatal dietary supplement may be administered in one or more doses daily. In some embodiments, the prenatal dietary supplement is administered in two doses daily. In a separate embodiment, the prenatal dietary supplement is administered in three daily doses. The prenatal dietary supplement may be administered to either pregnant women or women who are breastfeeding.

Any orally acceptable dosage form is contemplated by the present disclosure. Examples of such dosage forms include, but are not limited to pills, tablets, capsules, soft-gels, liquids, liquid concentrates, powders, elixirs, solutions, suspensions, emulsions, lozenges, beads, cachets, and combinations thereof. Alternatively, the prenatal dietary supplement of the invention may be added to a more complete nutritional product. In this embodiment, the nutritional product may contain protein, fat, and carbohydrate components and may be used to supplement the diet or may be used as the sole source of nutrition.

The nutritional composition(s) of the present disclosure may also comprise a carbohydrate source. Carbohydrate sources can be any used in the art, e.g., lactose, glucose, fructose, corn syrup solids, maltodextrins, sucrose, starch, rice syrup solids, and the like. The amount of carbohydrate in the nutritional composition typically can vary from between about 5 g and about 25 g/100 kcal. In some embodiments, the amount of carbohydrate is between about 6 g and about 22 g/100 kcal. In other embodiments, the amount of carbohydrate is between about 12 g and about 14 g/100 kcal.

In some embodiments, the carbohydrate source comprises corn syrup solids. Moreover, hydrolyzed, partially hydrolyzed, and/or extensively hydrolyzed carbohydrates may be desirable for inclusion in the nutritional composition due to their easy digestibility. Specifically, hydrolyzed carbohydrates are less likely to contain allergenic epitopes.

Non-limiting examples of carbohydrate materials suitable for use herein include hydrolyzed or intact, naturally or chemically modified, starches sourced from corn, tapioca, rice or potato, in waxy or non-waxy forms. Non-limiting examples of suitable carbohydrates include various hydrolyzed starches characterized as hydrolyzed cornstarch, maltodextrin, maltose, corn syrup, dextrose, corn syrup solids, glucose, and various other glucose polymers and combinations thereof. Non-limiting examples of other suitable carbohydrates include those often referred to as sucrose, lactose, fructose, high fructose corn syrup, indigestible oligosaccharides such as fructooligosaccharides and combinations thereof.

The nutritional composition(s) of the disclosure may also comprise a protein source. The protein source can be any used in the art, e.g., nonfat milk, whey protein, casein, soy protein, hydrolyzed protein, amino acids, and the like. Bovine milk protein sources useful in practicing the present disclosure include, but are not limited to, milk protein powders, milk protein concentrates, milk protein isolates, nonfat milk solids, nonfat milk, nonfat dry milk, whey protein, whey protein isolates, whey protein concentrates, sweet whey, acid whey, casein, acid casein, caseinate (e.g. sodium caseinate, sodium calcium caseinate, calcium caseinate) and any combinations thereof.

In one embodiment, the proteins of the nutritional composition are provided as intact proteins. In other embodiments, the proteins are provided as a combination of both intact proteins and partially hydrolyzed proteins, with a degree of hydrolysis of between about 4% and 10%. In certain other embodiments, the proteins are more completely hydrolyzed. In still other embodiments, the protein source comprises amino acids. In yet another embodiment, the protein source may be supplemented with glutamine-containing peptides.

In a particular embodiment of the nutritional composition, the whey:casein ratio of the protein source is similar to that found in human breast milk. In an embodiment, the protein source comprises from about 40% to about 80% whey protein and from about 20% to about 60% casein.

In some embodiments, the proteins of the nutritional composition are provided as intact proteins. In other embodiments, the proteins are provided as a combination of both intact proteins and hydrolyzed proteins, with a degree of hydrolysis of between about 4% and 10%. In certain other embodiments, the proteins are more hydrolyzed. In still other embodiments, the protein source comprises amino acids. In yet another embodiment, the protein source may be supplemented with glutamine-containing peptides. In another embodiment, the protein component comprises extensively hydrolyzed protein. In still another embodiment, the protein component of the nutritional composition consists essentially of extensively hydrolyzed protein in order to minimize the occurrence of food allergy.

In some embodiments, the protein component of the nutritional composition comprises either partially or extensively hydrolyzed protein, such as protein from cow's milk. The proteins may be treated with enzymes to break down some or most of the proteins that cause adverse symptoms with the goal of reducing allergic reactions, intolerance, and sensitization. Moreover, the proteins may be hydrolyzed by any method known in the art.

In some embodiments, the nutritional composition of the present disclosure is substantially free of intact proteins. In this context, the term "substantially free" means that the preferred embodiments herein comprise sufficiently low concentrations of intact protein to thus render the formula hypoallergenic. The extent to which a nutritional composition in accordance with the disclosure is substantially free of intact proteins, and therefore hypoallergenic, is determined by the August 2000 Policy Statement of the American Academy of Pediatrics in which a hypoallergenic formula is defined as one which in appropriate clinical studies demonstrates that it does not provoke reactions in 90% of infants or children with confirmed cow's milk allergy with 95% confidence when given in prospective randomized, double-blind, placebo-controlled trials.

The nutritional composition may be protein-free in some embodiments and comprise free amino acids as a protein equivalent source. In some embodiments, the amino acids may comprise, but are not limited to, histidine, isoleucine, leucine, lysine, methionine, cysteine, phenylalanine, tyrosine, threonine, tryptophan, valine, alanine, arginine, asparagine, aspartic acid, glutamic acid, glutamine, glycine, proline, serine, carnitine, taurine and mixtures thereof. In some embodiments, the amino acids may be branched chain amino acids. In certain other embodiments, small amino acid peptides may be included as the protein component of the nutritional composition. Such small amino acid peptides may be naturally occurring or synthesized. The amount of free amino acids in the nutritional composition may vary from about 1 g/100 kcal to about 5 g/100 kcal.

In some embodiments, the infant formula is protein-free and contains free amino acids as a protein equivalent source. In some embodiments, 100% of the free amino acids may have a molecular weight of less than 500 Daltons. In these embodiments, the nutritional formulation may be hypoallergenic.

In some embodiments, the nutritional composition comprises between about 1 g and about 7 g of a protein source per 100 kcal. In other embodiments, the nutritional composition comprises between about 3.5 g and about 4.5 g of protein per 100 kcal.

In some embodiments, the nutritional composition described herein comprises a lipid source. Appropriate lipid sources include, but are not limited to, animal sources, e.g., milk fat, butter, butter fat, egg yolk lipid; marine sources, such as fish oils, marine oils, single cell oils; vegetable and plant oils, such as corn oil, canola oil, sunflower oil, soybean oil, palm olein oil, coconut oil, high oleic sunflower oil, evening primrose oil, rapeseed oil, olive oil, flaxseed (linseed) oil, cottonseed oil, high oleic safflower oil, palm stearin, palm kernel oil, wheat germ oil; medium chain triglyceride oils and emulsions and esters of fatty acids; and any combinations thereof.

In some embodiments the nutritional composition may also include a source of LCPUFAs. In one embodiment the amount of LCPUFA in the nutritional composition is advantageously at least about 5 mg/100 kcal, and may vary from about 5 mg/100 kcal to about 100 mg/100 kcal, more preferably from about 10 mg/100 kcal to about 50 mg/100 kcal. Non-limiting examples of LCPUFAs include, but are not limited to, DHA, ARA, linoleic (18:2 n-6), γ-linolenic (18:3 n-6), dihomo-γ-linolenic (20:3 n-6) acids in the n-6 pathway, α-linolenic (18:3 n-3), stearidonic (18:4 n-3), eicosatetraenoic (20:4 n-3), eicosapentaenoic (20:5 n-3), and docosapentaenoic (22:6 n-3).

In some embodiments, the LCPUFA included in the nutritional composition may comprise DHA. In one embodiment the amount of DHA in the nutritional composition is from about 5 mg/100 kcal to about 75 mg/100 kcal. Still in some embodiments, DHA is present in the nutritional composition in an amount of from about 10 mg/100 kcal to about 50 mg/100 kcal.

In another embodiment, especially if the nutritional composition is an infant formula, the nutritional composition is supplemented with both DHA and ARA. In this embodiment, the weight ratio of ARA:DHA may be between about 1:3 and about 9:1 . In a particular embodiment, the ratio of ARA:DHA is from about 1:2 to about 4:1.

The DHA and ARA can be in natural form, provided that the remainder of the LCPUFA source does not result in any substantial deleterious effect on the infant. Alternatively, the DHA and ARA can be used in refined form.

The disclosed nutritional composition described herein can, in some embodiments, also comprise a source of β-glucan. Glucans are polysaccharides, specifically polymers of glucose, which are naturally occurring and may be found in cell walls of bacteria, yeast, fungi, and plants. Beta glucans (β-glucans) are themselves a diverse subset of glucose polymers, which are made up of chains of glucose monomers linked together via beta-type glycosidic bonds to form complex carbohydrates.

β-1,3-glucans are carbohydrate polymers purified from, for example, yeast, mushroom, bacteria, algae, or cereals. The chemical structure of β-1,3-glucan depends on the source of the β-1,3-glucan. Moreover, various physiochemical parameters, such as solubility, primary structure, molecular weight, and branching, play a role in biological activities of β-1,3-glucans. (Yadomae T., *Structure and biological activities of fungal beta-1,3-glucans*. Yakugaku Zasshi. 2000; 120:413-431.)

β-1,3-glucans are naturally occurring polysaccharides, with or without β-1,6-glucose side chains that are found in the cell walls of a variety of plants, yeasts, fungi and bacteria. β-1,3;1,6-glucans are those containing glucose units with (1,3) links having side chains attached at the (1,6) position(s). β-1,3;1,6 glucans are a heterogeneous group of glucose polymers that share structural commonalities, including a backbone of straight chain glucose units linked by a β-1,3 bond with β-1,6-linked glucose branches extending from this backbone. While this is the basic structure for the presently described class of β-glucans, some variations may exist. For example, certain yeast β-glucans have additional regions of β(1,3) branching extending from the β(1,6) branches, which add further complexity to their respective structures.

β-glucans derived from baker's yeast, *Saccharomyces cerevisiae*, are made up of chains of D-glucose molecules connected at the 1 and 3 positions, having side chains of glucose attached at the 1 and 6 positions. Yeast-derived β-glucan is an insoluble, fiber-like, complex sugar having the general structure of a linear chain of glucose units with a β-1,3 backbone interspersed with β-1,6 side chains that are generally 6-8 glucose units in length. More specifically, β-glucan derived from baker's yeast is poly-(1,6)-β-D-glucopyranosyl-(1,3)-β-D-glucopyranose.

Furthermore, β-glucans are well tolerated and do not produce or cause excess gas, abdominal distension, bloating or diarrhea in pediatric subjects. Addition of β-glucan to a nutritional composition for a pediatric subject, such as an infant formula, a growing-up milk or another children's nutritional product, will improve the subject's immune response by increasing resistance against invading pathogens and therefore maintaining or improving overall health.

In some embodiments, the β-glucan is β-1,3;1,6-glucan. In some embodiments, the β-1,3;1,6-glucan is derived from baker's yeast. The nutritional composition may comprise whole glucan particle β-glucan, particulate β-glucan, PGG-glucan (poly-1,6-β-D-glucopyranosyl-1,3-β-D-glucopyranose) or any mixture thereof.

In some embodiments, the amount of β-glucan in the nutritional composition is between about 3 mg and about 17 mg per 100 kcal. In another embodiment the amount of β-glucan is between about 6 mg and about 17 mg per 100 kcal.

The disclosed nutritional composition described herein can, in some embodiments, also comprise a source of probiotic. The term "probiotic" means a microorganism that exerts beneficial effects on the health of the host. Any probiotic known in the art may be acceptable in this embodiment. In a particular embodiment, the probiotic may be selected from any *Lactobacillus* species, *Lactobacillus rhamnosus* GG (ATCC number 53103), *Bifidobacterium* species, *Bifidobacterium longum* BB536 (BL999, ATCC: BAA-999), *Bifidobacterium longum* AH1206 (NCIMB: 41382), *Bifidobacterium breve* AH1205 (NCIMB: 41387), *Bifidobacterium infantis* 35624 (NCIMB: 41003), and *Bifidobacterium animalis* subsp. *lactis* BB-12 (DSM No. 10140) or any combination thereof.

If included, the nutritional composition may comprise between about $1 \times 10^4$ to about $1.5 \times 10^{10}$ cfu of probiotics per 100 kcal, more preferably from about $1 \times 10^6$ to about $1 \times 10^9$ cfu of probiotics per 100 kcal.

In an embodiment, the probiotic(s) may be viable or non-viable. As used herein, the term "viable", refers to live microorganisms. The term "non-viable" or "non-viable probiotic" means non-living probiotic microorganisms, their cellular components and/or metabolites thereof. Such non-viable probiotics may have been heat-killed or otherwise inactivated, but they retain the ability to favorably influence the health of the host. The probiotics useful in the present disclosure may be naturally-occurring, synthetic or developed through the genetic manipulation of organisms, whether such new source is now known or later developed.

The disclosed nutritional composition described herein can, in some embodiments, also comprise a source of prebiotics. The term "prebiotic" as used herein refers to indigestible food ingredients which exert health benefits upon the host. Such health benefits may include, but are not limited to, selective stimulation of the growth and/or activity of one or a limited number of beneficial gut bacteria, stimulation of the growth and/or activity of ingested probiotic microorganisms, selective reduction in gut pathogens, and favorable influence on gut short chain fatty acid profile. Such prebiotics may be naturally-occurring, synthetic, or developed through the genetic manipulation of organisms and/or plants, whether such new source is now known or developed later. Prebiotics useful in the present disclosure may include oligosaccharides, polysaccharides, and other prebiotics that contain fructose, xylose, soya, galactose, glucose and mannose.

More specifically, prebiotics useful in the present disclosure may include polydextrose, polydextrose powder, lactulose, lactosucrose, raffinose, gluco-oligosaccharide, inulin, fructo-oligosaccharide, isomalto-oligosaccharide, soybean oligosaccharides, lactosucrose, xylo-oligosaccharide, chito-oligosaccharide, manno-oligosaccharide, aribino-oligosaccharide, siallyl-oligosaccharide, fuco-oligosaccharide, galacto-oligosaccharide, and gentio-oligosaccharides. In one preferred embodiment, the prebiotic comprises galacto-oligosaccharide, polydextrose, or mixtures thereof.

The amount of galacto-oligosaccharide in the nutritional composition may, in an embodiment, be from about 0.1 mg/100 kcal to about 1.0 mg/100 kcal. In another embodiment, the amount of galacto-oligosaccharide in the nutritional composition may be from about 0.1 mg/100 kcal to about 0.5 mg/100 kcal. The amount of polydextrose in the nutritional composition may, in an embodiment, be within the range of from about 0.1 mg/100 kcal to about 0.5 mg/100 kcal. In another embodiment, the amount of polydextrose may be about 0.3 mg/100 kcal. In a particular embodiment, galacto-oligosaccharide and polydextrose are supplemented into the nutritional composition in a total amount of about at least about 0.2 mg/100 kcal and can be about 0.2 mg/100 kcal to about 1.5 mg/100 kcal. In some embodiments, the nutritional composition may comprise galactooligosaccharide and polydextrose in a total amount of from about 0.6 to about 0.8 mg/100 kcal.

The nutritional composition of the present disclosure, may comprise lactoferrin. Lactoferrins are single chain polypeptides of about 80 kD containing 1-4 glycans, depending on the species. The 3-D structures of lactoferrin of different species are very similar, but not identical. Each lactoferrin comprises two homologous lobes, called the N- and C-lobes, referring to the N-terminal and C-terminal part of the molecule, respectively. Each lobe further consists of two sub-lobes or domains, which form a cleft where the ferric ion (Fe3+) is tightly bound in synergistic cooperation with a (bi)carbonate anion. These domains are called N1, N2, C1 and C2, respectively. The N-terminus of lactoferrin has strong cationic peptide regions that are responsible for a number of important binding characteristics. Lactoferrin has a very high isoelectric point (~pI 9) and its cationic nature plays a major role in its ability to defend against bacterial, viral, and fungal pathogens. There are several clusters of cationic amino acids residues within the N-terminal region of lactoferrin mediating the biological activities of lactoferrin against a wide range of microorganisms.

Lactoferrin for use in the present disclosure may be, for example, isolated from the milk of a non-human animal or produced by a genetically modified organism. The nutritional compositions described herein can, in some embodiments comprise non-human lactoferrin, non-human lactoferrin produced by a genetically modified organism and/or human lactoferrin produced by a genetically modified organism.

Suitable non-human lactoferrins for use in the present disclosure include, but are not limited to, those having at least 48% homology with the amino acid sequence of human lactoferrin. For instance, bovine lactoferrin ("bLF") has an amino acid composition which has about 70% sequence homology to that of human lactoferrin. In some embodiments, the non-human lactoferrin has at least 65% homology with human lactoferrin and in some embodiments, at least 75% homology. Non-human lactoferrins acceptable for use in the present disclosure include, without limitation, bLF, porcine lactoferrin, equine lactoferrin, buffalo lactoferrin, goat lactoferrin, murine lactoferrin and camel lactoferrin.

bLF suitable for the present disclosure may be produced by any method known in the art. For example, in U.S. Pat. No. 4,791,193, incorporated by reference herein in its entirety, Okonogi et al. discloses a process for producing bovine lactoferrin in high purity. Generally, the process as disclosed includes three steps. Raw milk material is first contacted with a weakly acidic cationic exchanger to absorb lactoferrin followed by the second step where washing takes place to remove nonabsorbed substances. A desorbing step follows where lactoferrin is removed to produce purified bovine lactoferrin. Other methods may include steps as described in U.S. Pat. Nos. 7,368,141, 5,849,885, 5,919,913 and 5,861,491, the disclosures of which are all incorporated by reference in their entirety.

In certain embodiments, lactoferrin utilized in the present disclosure may be provided by an expanded bed absorption ("EBA") process for isolating proteins from milk sources. EBA, also sometimes called stabilized fluid bed adsorption, is a process for isolating a milk protein, such as lactoferrin, from a milk source comprises establishing an expanded bed adsorption column comprising a particulate matrix, applying a milk source to the matrix, and eluting the lactoferrin from the matrix with an elution buffer comprising about 0.3 to about 2.0 M sodium chloride. Any mammalian milk source may be used in the present processes, although in particular embodiments, the milk source is a bovine milk source. The milk source comprises, in some embodiments, whole milk, reduced fat milk, skim milk, whey, casein, or mixtures thereof.

In particular embodiments, the target protein is lactoferrin, though other milk proteins, such as lactoperoxidases or lactalbumins, also may be isolated. In some embodiments, the process comprises the steps of establishing an expanded bed adsorption column comprising a particulate matrix, applying a milk source to the matrix, and eluting the lactoferrin from the matrix with about 0.3 to about 2.0M sodium chloride. In other embodiments, the lactoferrin is eluted with about 0.5 to about 1.0 M sodium chloride, while in further embodiments, the lactoferrin is eluted with about 0.7 to about 0.9 M sodium chloride.

The expanded bed adsorption column can be any known in the art, such as those described in U.S. Pat. Nos. 7,812,138, 6,620,326, and 6,977,046, the disclosures of which are hereby incorporated by reference herein. In some embodiments, a milk source is applied to the column in an expanded mode, and the elution is performed in either expanded or packed mode. In particular embodiments, the elution is performed in an expanded mode. For example, the expansion ratio in the expanded mode may be about 1 to about 3, or about 1.3 to about 1.7. EBA technology is further described in international published application nos. WO 92/00799, WO 02/18237, WO 97/17132, which are hereby incorporated by reference in their entireties.

The isoelectric point of lactoferrin is approximately 8.9. Prior EBA methods of isolating lactoferrin use 200 mM sodium hydroxide as an elution buffer. Thus, the pH of the system rises to over 12, and the structure and bioactivity of lactoferrin may be comprised, by irreversible structural changes. It has now been discovered that a sodium chloride solution can be used as an elution buffer in the isolation of lactoferrin from the EBA matrix. In certain embodiments, the sodium chloride has a concentration of about 0.3 M to about 2.0 M. In other embodiments, the lactoferrin elution buffer has a sodium chloride concentration of about 0.3 M to about 1.5 M, or about 0.5 m to about 1.0 M.

The lactoferrin that is used in certain embodiments may be any lactoferrin isolated from whole milk and/or having a low somatic cell count, wherein "low somatic cell count" refers to a somatic cell count less than 200,000 cells/mL. By way of example, suitable lactoferrin is available from Tatua Co-operative Dairy Co. Ltd., in Morrinsville, New Zealand, from FrieslandCampina Domo in Amersfoort, Netherlands or from Fonterra Co-Operative Group Limited in Auckland, New Zealand.

Surprisingly, lactoferrin included herein maintains certain bactericidal activity even if exposed to a low pH (i.e., below about 7, and even as low as about 4.6 or lower) and/or high temperatures (i.e., above about 65° C., and as high as about 120° C.), conditions which would be expected to destroy or severely limit the stability or activity of human lactoferrin. These low pH and/or high temperature conditions can be expected during certain processing regimen for nutritional compositions of the types described herein, such as pasteurization. Therefore, even after processing regimens, lactoferrin has bactericidal activity against undesirable bacterial pathogens found in the human gut.

The nutritional composition may, in some embodiments, comprise lactoferrin in an amount from about 10 mg/100 kcal to about 250 mg/100 kcal. In some embodiments, lactoferrin may be present in an amount of from about 50 mg/100 kcal to about 175 mg/100 kcal. Still in some embodiments, lactoferrin may be present in an amount of from about 100 mg/100 kcal to about 150 mg/100 kcal.

The disclosed nutritional composition described herein, can, in some embodiments also comprise an effective amount of iron. The iron may comprise encapsulated iron forms, such as encapsulated ferrous fumarate or encapsulated ferrous sulfate or less reactive iron forms, such as ferric pyrophosphate or ferric orthophosphate.

One or more vitamins and/or minerals may also be added in to the nutritional composition in amounts sufficient to supply the daily nutritional requirements of a subject. It is to be understood by one of ordinary skill in the art that vitamin and mineral requirements will vary, for example, based on the age of the child. For instance, an infant may have different vitamin and mineral requirements than a child between the ages of one and thirteen years. Thus, the embodiments are not intended to limit the nutritional composition to a particular age group but, rather, to provide a range of acceptable vitamin and mineral components.

In embodiments providing a nutritional composition for a child, the composition may optionally include, but is not limited to, one or more of the following vitamins or derivations thereof: vitamin $B_1$ (thiamin, thiamin pyrophosphate, TPP, thiamin triphosphate, TTP, thiamin hydrochloride, thiamin mononitrate), vitamin $B_2$ (riboflavin, flavin mononucleotide, FMN, flavin adenine dinucleotide, FAD, lactoflavin, ovoflavin), vitamin $B_3$ (niacin, nicotinic acid, nicotinamide, niacinamide, nicotinamide adenine dinucleotide, NAD, nicotinic acid mononucleotide, NicMN, pyridine-3-carboxylic acid), vitamin $B_3$-precursor tryptophan, vitamin $B_6$ (pyridoxine, pyridoxal, pyridoxamine, pyridoxine hydrochloride), pantothenic acid (pantothenate, panthenol), folate (folic acid, folacin, pteroylglutamic acid), vitamin $B_{12}$ (cobalamin, methylcobalamin, deoxyadenosylcobalamin, cyanocobalamin, hydroxycobalamin, adenosylcobalamin), biotin, vitamin C (ascorbic acid), vitamin A (retinol, retinyl acetate, retinyl palmitate, retinyl esters with other long-chain fatty acids, retinal, retinoic acid, retinol esters), vitamin D (calciferol, cholecalciferol, vitamin $D_3$, 1,25,-dihydroxyvitamin D), vitamin E ($\alpha$-tocopherol, $\alpha$-tocopherol acetate, $\alpha$-tocopherol succinate, $\alpha$-tocopherol nicotinate, $\alpha$-tocopherol), vitamin K (vitamin $K_1$, phylloquinone, naphthoquinone, vitamin $K_2$, menaquinone-7, vitamin $K_3$, menaquinone-4, menadione, menaquinone-8, menaquinone-8H, menaquinone-9, menaquinone-9H, menaquinone-10, menaquinone-11, menaquinone-12, menaquinone-13), choline, inositol, $\beta$-carotene and any combinations thereof.

In embodiments providing a children's nutritional product, such as a growing-up milk, the composition may optionally include, but is not limited to, one or more of the following minerals or derivations thereof: boron, calcium, calcium acetate, calcium gluconate, calcium chloride, calcium lactate, calcium phosphate, calcium sulfate, chloride, chromium, chromium chloride, chromium picolonate, copper, copper sulfate, copper gluconate, cupric sulfate, fluoride, iron, carbonyl iron, ferric iron, ferrous fumarate, ferric orthophosphate, iron trituration, polysaccharide iron, iodide, iodine, magnesium, magnesium carbonate, magnesium hydroxide, magnesium oxide, magnesium stearate, magnesium sulfate, manganese, molybdenum, phosphorus, potassium, potassium phosphate, potassium iodide, potassium chloride, potassium acetate, selenium, sulfur, sodium, docusate sodium, sodium chloride, sodium selenate, sodium molybdate, zinc, zinc oxide, zinc sulfate and mixtures thereof. Non-limiting exemplary derivatives of mineral compounds include salts, alkaline salts, esters and chelates of any mineral compound.

The minerals can be added to growing-up milks or to other children's nutritional compositions in the form of salts such as calcium phosphate, calcium glycerol phosphate, sodium citrate, potassium chloride, potassium phosphate, magnesium phosphate, ferrous sulfate, zinc sulfate, cupric sulfate, manganese sulfate, and sodium selenite. Additional vitamins and minerals can be added as known within the art.

The nutritional compositions of the present disclosure may optionally include one or more of the following flavoring agents, including, but not limited to, flavored extracts, volatile oils, cocoa or chocolate flavorings, peanut butter flavoring, cookie crumbs, vanilla or any commercially available flavoring. Examples of useful flavorings include, but are not limited to, pure anise extract, imitation banana extract, imitation cherry extract, chocolate extract, pure lemon extract, pure orange extract, pure peppermint extract, honey, imitation pineapple extract, imitation rum extract, imitation strawberry extract, or vanilla extract; or volatile oils, such as balm oil, bay oil, bergamot oil, cedarwood oil, cherry oil, cinnamon oil, clove oil, or peppermint oil; peanut butter, chocolate flavoring, vanilla cookie crumb, butterscotch, toffee, and mixtures thereof. The amounts of flavoring agent can vary greatly depending upon the flavoring agent used. The type and amount of flavoring agent can be selected as is known in the art.

The nutritional compositions of the present disclosure may optionally include one or more emulsifiers that may be added for stability of the final product. Examples of suitable emulsifiers include, but are not limited to, lecithin (e.g., from egg or soy), alpha lactalbumin and/or mono- and di-glycerides, and mixtures thereof. Other emulsifiers are readily apparent to the skilled artisan and selection of suitable emulsifier(s) will depend, in part, upon the formulation and final product.

The nutritional compositions of the present disclosure may optionally include one or more preservatives that may also be added to extend product shelf life. Suitable preservatives include, but are not limited to, potassium sorbate, sodium sorbate, potassium benzoate, sodium benzoate, calcium disodium EDTA, and mixtures thereof.

The nutritional compositions of the present disclosure may optionally include one or more stabilizers. Suitable stabilizers for use in practicing the nutritional composition of the present disclosure include, but are not limited to, gum arabic, gum ghatti, gum karaya, gum tragacanth, agar, furcellaran, guar gum, gellan gum, locust bean gum, pectin, low methoxyl pectin, gelatin, microcrystalline cellulose, CMC (sodium carboxymethylcellulose), methylcellulose hydroxypropyl methyl cellulose, hydroxypropyl cellulose, DATEM (diacetyl tartaric acid esters of mono- and diglycerides), dextran, carrageenans, and mixtures thereof.

The nutritional compositions of the disclosure may provide minimal, partial or total nutritional support. The compositions may be nutritional supplements or meal replacements. The compositions may, but need not, be nutritionally complete. In an embodiment, the nutritional composition of the disclosure is nutritionally complete and contains suitable types and amounts of lipid, carbohydrate, protein, vitamins and minerals. The amount of lipid or fat typically can vary from about 1 to about 25 g/100 kcal. The amount of protein typically can vary from about 1 to about 7 g/100 kcal. The amount of carbohydrate typically can vary from about 6 to about 22 g/100 kcal.

In an embodiment, the children's nutritional composition may contain between about 10 and about 50% of the maximum dietary recommendation for any given country, or between about 10 and about 50% of the average dietary recommendation for a group of countries, per serving of vitamins A, C, and E, zinc, iron, iodine, selenium, and choline. In another embodiment, the children's nutritional composition may supply about 10-30% of the maximum dietary recommendation for any given country, or about 10-30% of the average dietary recommendation for a group of countries, per serving of B-vitamins. In yet another embodiment, the levels of vitamin D, calcium, magnesium, phosphorus, and potassium in the children's nutritional product may correspond with the average levels found in milk. In other embodiments, other nutrients in the children's nutritional composition may be present at about 20% of the maximum dietary recommendation for any given country, or about 20% of the average dietary recommendation for a group of countries, per serving.

In some embodiments the nutritional composition is an infant formula. Infant formulas are fortified nutritional compositions for an infant. The content of an infant formula is dictated by federal regulations, which define macronutrient, vitamin, mineral, and other ingredient levels in an effort to simulate the nutritional and other properties of human breast milk. Infant formulas are designed to support overall health and development in a pediatric human subject, such as an infant or a child.

In some embodiments, the nutritional composition of the present disclosure is a growing-up milk. Growing-up milks are fortified milk-based beverages intended for children over 1 year of age (typically from 1-3 years of age, from 4-6 years of age or from 1-6 years of age). They are not medical foods and are not intended as a meal replacement or a supplement to address a particular nutritional deficiency. Instead, growing-up milks are designed with the intent to serve as a complement to a diverse diet to provide additional insurance that a child achieves continual, daily intake of all essential vitamins and minerals, macronutrients plus additional functional dietary components, such as non-essential nutrients that have purported health-promoting properties.

The exact composition of a growing-up milk or other nutritional composition according to the present disclosure can vary from market-to-market, depending on local regulations and dietary intake information of the population of interest. In some embodiments, nutritional compositions according to the disclosure consist of a milk protein source, such as whole or skim milk, plus added sugar and sweeteners to achieve desired sensory properties, and added vitamins and minerals. The fat composition includes an enriched lipid fraction derived from milk. Total protein can be targeted to match that of human milk, cow milk or a lower value. Total carbohydrate is usually targeted to provide as little added sugar, such as sucrose or fructose, as possible to achieve an acceptable taste. Typically, Vitamin A, calcium and Vitamin D are added at levels to match the nutrient contribution of regional cow milk. Otherwise, in some embodiments, vitamins and minerals can be added at levels that provide approximately 20% of the dietary reference intake (DRI) or 20% of the Daily Value (DV) per serving. Moreover, nutrient values can vary between markets depending on the identified nutritional needs of the intended population, raw material contributions and regional regulations.

The disclosed nutritional composition(s) may be provided in any form known in the art, such as a powder, a gel, a suspension, a paste, a solid, a liquid, a liquid concentrate, a reconstituteable powdered milk substitute or a ready-to-use product. The nutritional composition may, in certain embodiments, comprise a nutritional supplement, children's nutritional product, infant formula, human milk fortifier, growing-up milk or any other nutritional composition designed for an infant or a pediatric subject. Nutritional compositions of the present disclosure include, for example, orally-ingestible, health-promoting substances including, for example, foods, beverages, tablets, capsules and powders. Moreover, the nutritional composition of the present disclosure may be standardized to a specific caloric content, it may be provided as a ready-to-use product, or it may be provided in a concentrated form. In some embodiments, the nutritional composition is in powder form with a particle size in the range of 5 µm to 1500 µm, more preferably in the range of 10 µm to 300 µm.

Further, the disclosure provides methods of aiding in and promoting digestion in a pediatric subject by providing a nutritional composition comprising an oil blend including triglycerides, wherein about 10% to about 60% of the palmitic acid (C16:0) residues are in the sn-2 position, to targeted subjects. In some embodiments, the nutritional composition provided further comprises at least one of the following: a carbohydrate source, a protein source, a lipid source, a source of long chain polyunsaturated fatty acids, a probiotic, a prebiotic, β-glucan, lactoferrin, a source of iron, and combinations thereof.

In some embodiments, the disclosure provides methods of promoting cognitive development in a pediatric subject by providing a nutritional composition comprising an oil blend including triglycerides, wherein about 10% to about 60% of the palmitic acid (C16:0) residues are in the sn-2 position, to targeted subjects.

All combinations of method or process steps as used herein can be performed in any order, unless otherwise specified or clearly implied to the contrary by the context in which the referenced combination is made.

The methods and compositions of the present disclosure, including components thereof, can comprise, consist of, or consist essentially of the essential elements and limitations of the embodiments described herein, as well as any additional or optional ingredients, components or limitations described herein or otherwise useful in nutritional compositions.

FORMULATION EXAMPLES

Table 1 illustrates a nutritional formulation that includes ceramides, galactose, sialic acid, and cholesterol.

Table 1

Table 1, illustrated below, provides an example embodiment of the nutritional profile of a nutritional composition including ceramides, galactose, sialic acid, and cholesterol as described herein.

TABLE 1

Nutrition profile of a nutritional composition including ceramides, galactose, sialic acid, and cholesterol

| Nutrient | per 100 kcal | |
|---|---|---|
| | Minimum | Maximum |
| Protein (g) | 1.8 | 6.8 |
| Fat (g) | 1.3 | 7.2 |
| Carbohydrates (g) | 6 | 22 |
| Ceramides (mg) | 0.015 | 3 |
| Galactose (mg) | 15 | 450 |
| Sialic Acid (mg) | 1.5 | 75 |
| Cholesterol (mg) | 50 | 400 |
| DHA (g) | 4 | 22 |
| Vitamin A (IU) | 134 | 921 |
| Vitamin D (IU) | 22 | 126 |
| Vitamin E (IU) | 0.8 | 5.4 |
| Vitamin K (mcg) | 2.9 | 18 |
| Thiamin (mcg) | 63 | 328 |
| Riboflavin (mcg) | 68 | 420 |
| Vitamin B6 (mcg) | 52 | 397 |
| Vitamin B12 (mcg) | 0.2 | 0.9 |
| Niacin (mcg) | 690 | 5881 |
| Folic acid (mcg) | 8 | 66 |
| Panthothenic acid (mcg) | 232 | 1211 |
| Biotin (mcg) | 1.4 | 5.5 |
| Vitamin C (mg) | 4.9 | 24 |
| Choline (mg) | 4.9 | 43 |
| Calcium (mg) | 68 | 297 |
| Phosphorus (mg) | 54 | 210 |
| Magnesium (mg) | 4.9 | 34 |
| Sodium (mg) | 24 | 88 |
| Potassium (mg) | 82 | 346 |
| Chloride (mg) | 53 | 237 |
| Iodine (mcg) | 8.9 | 79 |
| Iron (mg) | 0.7 | 2.8 |
| Zinc (mg) | 0.7 | 2.4 |
| Manganese (mcg) | 7.2 | 41 |
| Copper (mcg) | 16 | 331 |

All references cited in this specification, including without limitation, all papers, publications, patents, patent applications, presentations, texts, reports, manuscripts, brochures, books, internet postings, journal articles, periodicals, and the like, are hereby incorporated by reference into this specification in their entireties. The discussion of the references herein is intended merely to summarize the assertions made by their authors and no admission is made that any reference constitutes prior art. Applicants reserve the right to challenge the accuracy and pertinence of the cited references.

Although embodiments of the disclosure have been described using specific terms, devices, and methods, such description is for illustrative purposes only. The words used are words of description rather than of limitation. It is to be understood that changes and variations may be made by those of ordinary skill in the art without departing from the spirit or the scope of the present disclosure, which is set forth in the following claims. In addition, it should be understood that aspects of the various embodiments may be interchanged in whole or in part. Therefore, the spirit and scope of the appended claims should not be limited to the description of the versions contained therein.

What is claimed is:
1. A nutritional composition comprising:
   a carbohydrate source;
   a protein source;
   a lipid source; and
   a plant-based or fungal source of ceramides comprising a ceramide attached to a sugar moiety, wherein the plant-based or fungal source of ceramides is enriched in the ceramide attached to a sugar moiety, wherein the ceramide attached to a sugar moiety is selected from the group consisting of galactosyl-ceramide and glucosyl-ceramide, and the ceramide attached to a sugar moiety is present in an amount of about 15 µg/100 kcal to about 3 mg/100 kcal of the nutritional composition, wherein the nutritional composition is a powdered nutritional composition having a particle size in the range of 5 µm to 1500 µm.

2. The nutritional composition of claim 1, further comprising at least one nutrient selected from the group consisting of galactose, sialic acid, and cholesterol.

3. The nutritional composition of claim 1, wherein the ceramide attached to a sugar moiety is present in an amount of from about 500 µg/100 kcal to about 2 mg/100 kcal of the nutritional composition.

4. Then nutritional composition of claim 2, wherein galactose is present in an amount of from about 15 mg/100 kcal to about 450 mg/100 kcal of the nutritional composition.

5. The nutritional composition of claim 2, wherein sialic acid is present in the nutritional composition in an amount of from about 1.5 mg/100 kcal to about 75 mg/100 kcal of the nutritional composition.

6. The nutritional composition of claim 2, wherein cholesterol is present in the nutritional composition in an amount of from about 50 mg/100 kcal to about 400 mg/100 kcal of the nutritional composition.

7. The nutritional composition of claim 1, wherein the nutritional composition further comprises β-glucan.

8. The nutritional composition of claim 1, wherein the protein source of the nutritional composition comprises hydrolyzed proteins.

9. The nutritional composition of claim 1, further comprising DHA.

10. The nutritional composition of claim 1, wherein the nutritional composition is an infant formula.

11. The composition of claim 1, wherein the plant-based or fungal source of ceramides is selected from the group consisting of wheat, barley, oat, corn, soy, wheat germ oil, unrefined corn oil, soy lecithin enriched using polar solvents by supercritical methods, and barley malt harvested under particular time and temperature conditions.

12. The composition of claim 1, wherein the ceramide attached to a sugar moiety comprises at least one saturated or unsaturated fatty acid specific to the plant-based or fungal source.

13. A nutritional composition, comprising per 100 kcal:
  (i) between about 6 g and about 22 g of a carbohydrate source;
  (ii) between about 1 g and about 7 g of a protein source;
  (iii) between about 1.3 g and about 7.2 g of a lipid source;
  (iv) between about 15 µg and about 3 mg of at least one ceramide attached to a sugar moiety;
  (v) between about 15 mg and about 450 mg of galactose;
  (vi) between about 1.5 mg and about 75 mg of sialic acid;
  (vii) between about 50 mg and about 400 mg of cholesterol;
wherein the at least one ceramide attached to a sugar moiety and the galactose are derived from a plant-based or fungal source, wherein the ceramide attached to a sugar moiety comprises at least one saturated or unsaturated fatty acid specific to the plant-based or fungal source, wherein the nutritional composition is a powdered nutritional composition having a particle size in the range of 5 µm to 1500 µm.

14. The nutritional composition of claim 13, further comprising a source of long chain polyunsaturated fatty acids.

15. The nutritional composition of claim 13, further comprising a source of lactoferrin.

* * * * *